United States Patent [19]

Northedge

[11] Patent Number: 4,881,412

[45] Date of Patent: Nov. 21, 1989

[54] FLOW METERS

[76] Inventor: Ronald Northedge, Old Signal Point, La Moye, St. Brelades, Jersey, Channel Islands

[21] Appl. No.: 228,781

[22] Filed: Aug. 4, 1988

Related U.S. Application Data

[63] Continuation of Ser. No. 895,931, Aug. 13, 1986.

[30] Foreign Application Priority Data

Aug. 14, 1985 [GB] United Kingdom ............... 8520363

[51] Int. Cl.$^4$ .............................................. G01F 1/74
[52] U.S. Cl. .................................. 73/861.04; 55/204; 73/61.1 R; 73/200; 364/510
[58] Field of Search ............... 73/861.04, 861.02, 200, 73/597, 61.1 R; 55/191, 204, 169, 52; 364/510

[56] References Cited

U.S. PATENT DOCUMENTS

| | | |
|---|---|---|
| 3,525,258 | 8/1970 | Fowler et al. |
| 3,635,082 | 1/1972 | Prellwitz et al. ............... 73/861.04 |
| 4,187,088 | 2/1980 | Hodgson ............... 55/204 |
| 4,215,567 | 8/1980 | Vlcek ............... 73/61.1 R |
| 4,225,778 | 9/1980 | Ghahramani ............... 73/61.1 R |
| 4,272,982 | 6/1981 | Arnold et al. ............... 73/861.04 |
| 4,282,760 | 8/1981 | Pitts et al. ............... 73/861.04 |
| 4,419,898 | 12/1983 | Zanker et al. ............... 73/861.02 |
| 4,429,581 | 2/1984 | Furmaga ............... 73/861.04 |
| 4,596,136 | 6/1986 | Zacharias ............... 73/861.04 |
| 4,596,586 | 6/1986 | Davies et al. ............... 55/191 |
| 4,656,869 | 4/1987 | Zacharias ............... 73/61.1 R |
| 4,660,414 | 4/1987 | Hatton et al. ............... 73/61.1 R |
| 4,773,257 | 9/1988 | Aslesen et al. ............... 73/861.04 |
| 4,776,210 | 11/1988 | Baillie et al. ............... 73/61.1 R |

FOREIGN PATENT DOCUMENTS

| | | |
|---|---|---|
| 2089049 | 6/1982 | United Kingdom . |
| 2107051 | 4/1983 | United Kingdom . |
| 2128756 | 5/1984 | United Kingdom . |

OTHER PUBLICATIONS

Procurement Executive, Ministry of Defence, "Patents Act 1977–Section 21 Observations on UK Patent Application No. 8520363 Published as GB 2179156A".

Primary Examiner—Joseph A. Orsino
Assistant Examiner—Brent A. Swarthout
Attorney, Agent, or Firm—Leydig, Voit & Mayer

[57] ABSTRACT

A 3-phase flow meter comprises a pipeline containing pressure and temperature meters and a meter for measuring the density of the combined flow. A proportion of the flow is diverted through a separator which separates out the gas component from the liquid components. A density meter is provided to measure the density of the combined liquid components. The outputs of the various meters are fed to a processing circuit which outputs the volumes and masses of the three phases.

14 Claims, 2 Drawing Sheets

FLOW METERS

This application is a continuation of application Ser. No. 895,931, filed 8/13/86.

TECHNICAL FIELD

The present invention relates to flow meters and, more particularly, to flow meters for measuring the masses or volumes of three phases flowing along a single pipe. Such a flow meter is referred to as a 3-phase flow meter.

An oil well produces a mixture of oil, water and gas in normal production. In order to assess the productivity of an oil well it is necessary to know how much of these three phases: oil, water and gas, is being produced. All three phases are to be found flowing along a single pipeline from the well. The phases may be mixed or be stratified in the pipeline depending on the distance of the sampling point from the well head. The phases may also be travelling at different velocities within the pipeline.

Prior Art

The conventional way of measuring the volume rate of flow or, equivalently where the densities are known, the mass rate of flow of the three phases produced by an oil well is to divert the output from the well into a separator for a test period. Gravity type or centrifugal separators are typically employed. A typical gravity type separator needs to be of considerable height, of the order of, say, 10 meters. Centrifugal separators are also of large dimensions.

The outputs of the separator are taken at different points. In a gravity type separator gas is separated out and led away from the highest outlet, the separated water is fed out from the lowest outlet, and the oil from an intermediate outlet. Each of the outlets is connected to a respective mass flow meter which measures the amount of oil, water or gas respectively.

In a centrifugal separator the input mixture is fed to a centrifuge and the various phases are separated and fed out along outlets at different radial positions. Again it is necessary to provide a separate mass flow meter on each outlet.

Such systems have considerable disadvantages. Firstly, it is necessary to considerably drop the production pressure of, for example, 5000 psi (34.5 kN/m$^2$) before feeding the mixture to the separator. This is significant because, after separation, the oil is re-injected into the oil well output and this needs to take place at as high a pressure as possible. Secondly, it takes a considerable test period to get an accurate estimate of the relative amounts of oil, water and gas being produced by the oil well. This period needs to be at least 24 hours and in certain circumstances a test period of several days may be required. Since such testing has to be repeated at regular intervals in order to ensure that the well is not producing excessive quantities of water or gas, such extended test periods represent a considerable inconvenience and reduction in the productivity of the oil well.

U.S. Pat. No. 4,429,581 describes a system for measuring the rate of flow of the three phases produced by an oil well which is intended to overcome some of the problems described above in relation to the conventional system by using a sampling technique. In this system the output of the oil well is diverted first to a mass flow measurement unit and, thereafter, a sample of the flow is directed to a test separator. After the sample has been taken the remainder of the flow is directed to the well output. Because only a sample of the production is taken the separator can be reduced in size. The separated liquid portion is connected to the input of a net oil computer which monitors the liquid flow rate and determines the percentage of oil and water in the liquid portion. The separated gas is connected to a flare and the separated liquid is passed to a liquid dump after passage through the oil computer. A density and temperature probe is also connected into the main flow pipeline. Outputs from the mass flow measuring unit, the density and temperature probe and the net oil computer are processed to derive the flow rates of the individual phases contained in the sample which was withdrawn.

This system has the disadvantage that it requires a complex system of valves to ensure that the mass flow measurement and direction of the flow to the test separator are carried out in the correct sequence. It also has the disadvantage that it is only capable of providing data on the particular sample taken. A further disadvantage is that the sample taken is wasted and cannot be returned to the production fluid. Therefore, if the system is to produce accurate information, samples must be taken frequently and this will lead to a considerable loss of production fluid.

U.S. Pat. No. 4,272,982 and U.S. Pat. No. 4,282,760 also describe flow meters for mixed liquid and gas. Both these flow meters incorporate centrifugal separators connected in the main fluid pipeline. It is not considered to be practicable to use such a centrifugal separator in the main production outlet from an oil well since it would require a considerable reduction in the output pressure. Therefore, such flowmeters could only be used by diverting the output from the well through them at reduced pressure.

SUMMARY OF THE INVENTION

An object of the invention is to provide a more efficient system of monitoring the respective flow rates of a mixture of several fluid components such as a mixture of oil, water and gas being produced by an oil well.

The invention accordingly provides a flow meter for measuring the flow of each of up to three distinct fluid components in a mixture including a pipeline for carrying the mixture of up to three distinct fluid components, a flow meter operatively associated with said pipeline in order to produce a first signal representing the volume flow rate of the mixture, means operatively associated with said pipeline in order to produce a second signal representing the density of the mixture in said pipeline, a pipe connected into said pipeline in order to continuously withdraw a fraction of said fluid mixture from the pipeline, a continuous separator having an inlet connected to said pipe and two outlets, the separator being operative to separate any gaseous component from the non-gaseous components of said mixture said gaseous components being supplied to one said outlet and said non-gaseous component(s) to the other said outlet, means operatively associated with said separator adjacent said other said outlet to produce a third signal representing the combined density of the non-gaseous component(s) of the mixture, processing means connected to receive said first, second and third signals and operative to process them to produce outputs representing the flow rate of each fluid component passed through said pipeline, and further pipe means connecting at least one of said two outlets of said separator into said pipeline.

Such a 3-phase mass flow meter is capable of providing continuous monitoring of the relative masses of gas, oil and water components of a fluid output from an oil well by withdrawing only a fraction of the mixture for separation of the gas only. For this purpose a very much smaller separator, having a height of typically 10 cm, can be used instead of the large gravity separators previously employed.

In one embodiment the volume flow meter comprises a velocity meter, a pressure sensor and a temperature sensor, the outputs of which are fed to the processing means for producing said first signal.

Preferably the means for producing signals representing density comprise nucleonic density meters. Alternatively a capacitive density meter may be employed. In a further embodiment density is measured by a differential pressure meter in conjunction with the velocity meter.

In order to provide efficient separation of the gas from the remaining components, a preferred embodiment of the invention uses a novel separator comprising a vertically disposed cylindrical chamber having a fluid inlet adjacent the top of the chamber, said fluid inlet being adapted to direct the incoming fluid tangentially around the cylindrical interior wall of the chamber, an open-ended conical mesh member disposed with its base below said inlet, a gas outlet disposed above said inlet and above a top end of said mesh member, and an outlet below said mesh member for non-gaseous components of the input fluid.

Preferably two coaxial mesh members are provided, the lower member having a finer mesh. The meshes are sufficiently coarse to allow some solid particles in the inlet fluid to pass through them without blocking subsequent flow. The members are also preferably spaced from the chamber wall to allow larger particles to pass. Thus it is possible for all solid matter to flow through the separator.

The provision of the mesh members enables gas-containing liquid to be retained on the surface until the gas has escaped from the liquid. The use of a finer mesh member below the first mesh member allows gas actually in solution to be removed.

The tangential input to the separator also ensures that maximum separation of gas is produced as the fluid is swirled round the walls of the separator chamber.

A separator as defined above can readily separate the gas component from an input fluid in a relatively short period of time.

When such a separator is used in the flow meter of the invention a density meter is disposed below the mesh member(s) in order to produce said third signal representing the density of the remaining components of the fluid after the gas has been separated.

Two embodiments of a 3-phase mass flow meter in accordance with the invention and a gas separator which may be used in such flow meters will now be described, by way of example only, with reference to the accompanying diagrammatic drawings.

DESCRIPTION OF PREFERRED EMBODIMENTS

Figure 1:
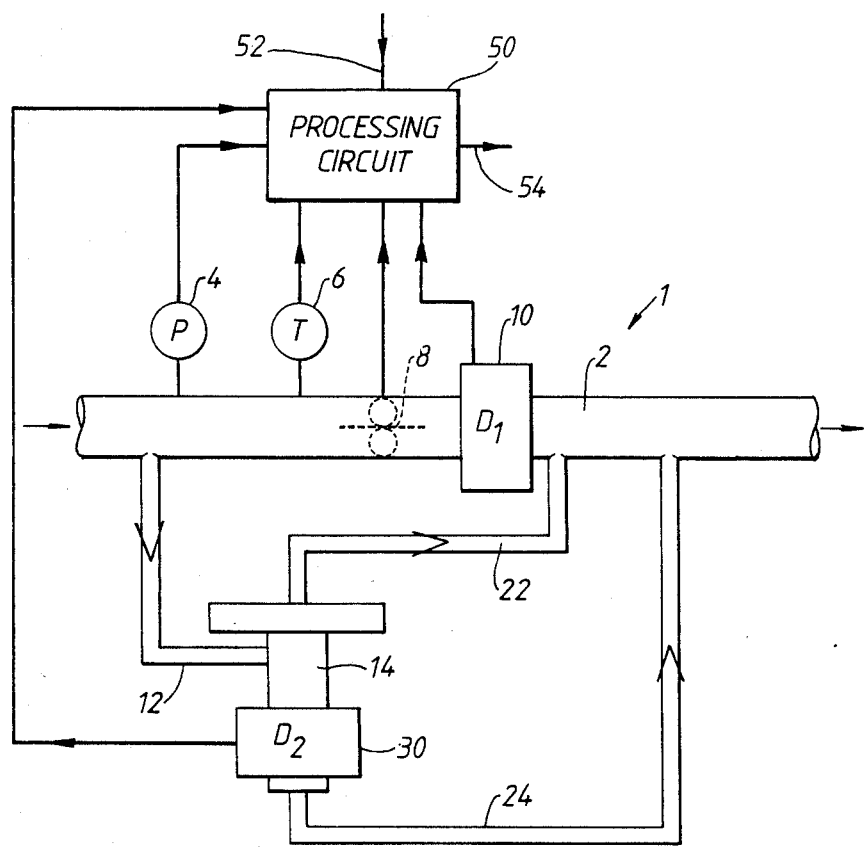
FIG. 1 is a diagrammatic representation of the first flow meter.

The flow meter 1 illustrated in FIG. 1 comprises a pipeline 2 which may be connected in a bypass arrangement to the output of one or more oil wells to enable the flow meter to be selectively connected to the output of any one of several oil wells to monitor the relative outputs of gas, oil and water in the output of each oil well. It will be appreciated that the described 3-phase volume or mass flow meter may have other applications where it is desired to measure the relative amounts of different fluid components in a combined output. However, for the purposes of simplicity, the present invention will be described in relation to the use of the flow meter for monitoring the gas, oil and water output of an oil well.

In the pipeline 2 are connected a pressure sensor 4, a temperature sensor 6, a velocity meter 8, and a density meter 10. The outputs of all these meters, 4, 6, 8, 10 are fed to a processing circuit 50 for example a microcomputer. The processing circuit derives a signal representative of the total volume flow from the outputs from the pressure, temperature and velocity meters. The processing circuit may use any conventional method to derive the total volume flow from the input signals. Various such processing methods are known which take account of Boyle's law together with the effects of supercompressibility which causes the relationship between pressure temperature and volume to deviate from the conventional Boyle's law.

Figure 3:
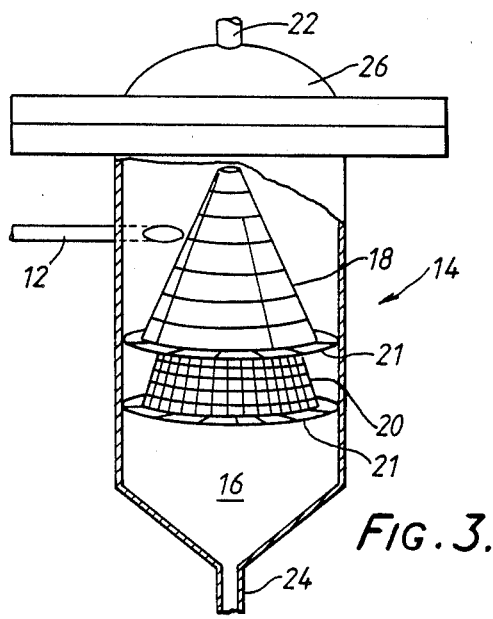
FIG. 3 is a partially cut-away view of a gas separator for use in the flow meter of FIG. 1 or FIG. 2.

A proportion of the stream flowing in the pipeline 2 is diverted through a pipe 12 to a separator 14. The separator 14 is illustated in more detail in FIG. 3. The separator 14 consists of a cylindrical chamber 16 which has its central axis arranged substantially vertically. The inlet pipe 12 is connected to an upper part of the chamber. The junction between the inlet pipe 12 and the chamber is such that the fluid flowing out of the pipe is directed tangentially around the cylindrical wall of the chamber 16. Disposed in the upper part of the chamber 16 are two conical mesh members 18, 20. Both members have their inner lower edges spaced from the chamber wall below the inlet 12 by spacer means 21 allowing a sufficient gap for solids to pass through. The members are mounted on pillars (not shown) which do not obstruct flow through the separator. The upper conical member is open at both ends. The narrower end of the upper mesh member 18 is positioned above the level of the inlet 12. The upper mesh member typically has a mesh size of 0.5 mm. and the lower mesh member a mesh size of 0.1 to 0.2 mm. The chamber 16 has two outlets 22, 24. The first outlet 22 is disposed centrally in an upper cap 26 of the chamber. This outlet 22 takes off the gas components separated by the separator from the input fluid mixture. The second outlet 24 is disposed centrally at the base of the chamber 16. The chamber 16 preferably has an inverted conical base which is tapered towards the outlet 24. The outlet 24 takes off the liquid components of the input fluid mixture.

The separator 14 operates by the combined effects of the swirling motion of the input fluid mixture and the conical mesh members to separate out the gas from the liquid components. The gas is partially knocked out as the fluid is swirled around the walls of the chamber. The larger of any remaining gas-containing droplets of fluid tend to be caught on the meshes of the upper conical member 18. The gas escapes from such droplets on the mesh thereby allowing the liquid components to drop through to the outlet 24. The lower mesh member 20 removes finer bubbles from the mixture and has the effect of removing gas that is actually in solution. The provision of two conical members 18, 20 ensures a very thorough separation of the gas component. However, only one member may be provided. Since the input fluid mixture from an oil well tends to contain a proportion of sand and other solid matter, the mesh of the conical members is relatively coarse in order to allow the sand to pass through without blocking the mesh. The spacer means allows larger particles to pass through so that all solid matter is passed back to the pipeline thus ensuring that the separator can operate for long periods without becoming blocked by solid matter. If the separator was being used with an input free of solid matter, a finer mesh could be utilized for the conical members so that only one would be necessary.

A density meter 30 is positioned in the lower part of the separator 14 between the mesh members and the outlet 24 to measure the density of the liquid components of the fluid. The output signal from the density meter 30 is fed to the processing circuit 50. The outlets 22 and 24 from the separator 14 are directed back to the main pipeline downstream of the meters, 4, 6, 8 and 10.

The density meters 10 and 30 are preferably nuleonic density meters. Such meters produce an output signal representing the average value of the density of a liquid passing through the meter over a period of time. The time period, usually referred to as the time constant of the meter, may be in the range from 1 to 5 minutes. As the time constant increases, so does the accuracy of the density meter. The time constant can be effectively varied by adjusting the time taken for liquid to flow through the separator 14. The time period may be modified by adjusting the design parameters of the chamber and conical mesh members.

Figure 2:
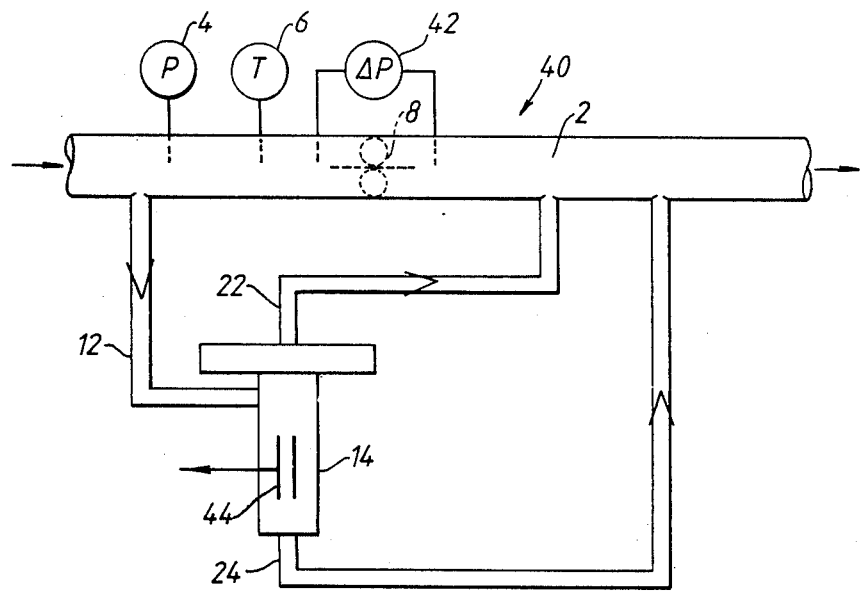
FIG. 2 is a diagrammatic representation of the second flow meter.

The flow meter 40 illustrated in FIG. 2 is essentially similar to that illustrated in FIG. 1. This flow meter does not require the use of nucleonic density meters. In place of the density meter 10, an additional differential pressure meter 42 is provided. The outputs from the pressure meter 4, temperature meter 6, velocity meter 8 and differential pressure meter 42 are fed to the processing circuit which derives both the volume flow rate and the density of the combined flow. The density of the liquid components of the flow is measured by a capacitor 44 disposed in the separator 14 downstream of the mesh members. The output signal from the capacitor 44 is the voltage across it which varies depending on the conductivity of the liquid between the plates. This conductivity is, in turn, dependent on the relative proportion of water and oil in the liquid.

The processing circuit 50 also has an input 52 by means of which the known densities of the various separate fluid phases may be supplied to the processing circuit. The output 54 from the circuit 50 represents the current volume or mass flow rates of the phases.

The operation of the processing circuit 50 to output the volume or mass flow rates of the three phases being produced by an oil well during a test period will now be described in more detail.

Let us suppose that phase 1 is gas, phase 2 is water and phase 3 is oil. The mass flow rate, volume flow rate and density of each phase will be designated by $m_i$, $v_i$ and $d_i$ respectively where i=1, 2 or 3 in dependence on the phase under consideration.

In the meter of FIG. 1 let the signal produced by the pressure meter 4 be P, the signal produced by the temperature meter 6 be T, the signal produced by the velocity meter 8 be F, the signal produced by the density meter 10 be $D_1$ and the signal produced by the density meter 30 be $D_2$.

The volume rate of flow V of the mixture in terms of cubic meters per unit time at a reference pressure and temperature is derived by the processing circuit from the following equation $$V = \frac{PF}{T} f_z (P,F,T) \quad (1)$$

where $f_z(P,F,T)$ is a super compressibility factor which is dependent on the pressure and temperature as well as the velocity.

Since density meter 10 is located in the main pipeline 2 it measures the combined density of the three phases. Therefore, $$D_1 = \frac{m_1 + m_2 + m_3}{V} \quad (2)$$

Since $m_i = v_i d_i$ $$D_1 = \frac{v_1 d_1}{V} + \frac{v_2 d_2}{V} + \frac{v_3 d_3}{V} \quad (3)$$

Since density meter 30 only measures the density of the combined liquid phases $$D_2 = \frac{v_2 d_2}{v_2 + v_3} + \frac{v_3 d_3}{v_2 + v_3} \quad (4)$$

From the three equations (1), (3) and (4) and the known values of the density of each phase, the processing circuit can readily derive the values of $v_i$. From the values of $v_i$ and the values of the density the mass rate of flow for each phase can be derived. By integrating with respect to time the volume and mass rate of flow signals the accumulated mass and volume flows of each phase can be output from the total test period.

In the flow meter of FIG. 2 the signal $D_1$ is derived as proportional to the output of the differential pressure meter divided by the square of the output of the velocity meter since $$P \alpha \tfrac{1}{2} D_1 F^2$$

where P is the pressure drop across the velocity meter 8, as is shown in FIG. 2. It follows that $D_1$ is proportional to P (measured by meter 42) divided by the square of velocity F (measured by meter 8). In this way the processing circuit 50 derives the mixture density $D_1$. The output from the capacitor 44 produces a signal proportional to D2.

It will be appreciated that in both the embodiments of the invention various calibration constants are required. Such calibration constants may be derived by passing known mixtures or single phase flows through the flow meter during a calibration process. These calibration constants will then be stored in the processing circuit for future use. It will be appreciated further that the values of the densities may vary depending upon the stage of production of the oil well being monitored. Therefore, the processing circuit may need to be provided with new values for these densities from time to time or depending on the well under test.

The 3-phase meters described are preferably located close to the output from the oil well which is to be monitored so that the phases in the pipeline 2 have not had time to stratify. However, if circumstances dictate that the flow meter must be positioned further downstream, a choke would be required upstream of the meters illustrated in order to produce a substantially uniform mixture of the phases in the input to the meter. This is necessary to ensure that the sub-stream led off through pipe 12 contains the same relative proportions of the phases as the main stream.

It will be appreciated that the described flow meter can operate at normal production pressures from an oil well.

Flow meters as shown in FIGS. 1 and 2 can readily be disposed sub-sea for monitoring the output of sub-sea oil wells. Preferably the signals from the various meters are fed along an electrical cable, a fibre optic link or a sonar or acoustic link to a processing circuit on the surface. If communications present a difficulty and only a low bandwidth link is available, a divided processing circuit may be provided. In this case, the main calculations will be carried out sub-sea and the results transmitted to a computer at the surface where final adjustments may be made to correct the output. This may be required where the density of the gas or oil being produced by the well being monitored varies over time, or where the same flow meter is being used to monitor the outputs of several different oil wells.

In a sub-sea application, it may be necessary to make the entire system self-contained. In this case a turbine generator may be fitted in the pipeline 2 upstream of the meter so as to generate the necessary power supplies for the meters and the processing circuit or that part of the processing circuit, if any, which is located sub-sea, as well as for the communications link. In this way the entire system may be incorporated in a sealed unit which may be submerged for a period of years without requirement for maintenance. Installation of such a self-contained unit may be carried out sub-sea by the use of a remote operated vehicle. It is only necessary to connect the pipeline 2 in a bypass manner to the main oil well outlet so that oil production can be diverted through the flow meter when test is required and bypass it at other times. The required flow control valves to switch the flow meter in or out can readily be controlled from the surface. Where the unit is fitted with a generator it is also preferably provided with a battery for storing energy and for maintaining the power supplies to the various units constant during fluctuations in the flow.

The described system can be mounted in a container with dimensions of the order of one meter by one meter by three meters as a typical example. This is considerably smaller than conventional centrifugal or gravity type separators.

I claim:

1. A flow meter, suitable for location in a sub-sea environment, for continuously measuring the flow of each of up to three distinct fluid components, at least one being liquid and at least one other being gaseous, of a mixture flowing through a pipeline, and comprising:
   first sensing means operatively associated with said pipeline and producing continuous first signals representing the values, existing in the mixture, of parameters on which the total volume flow rate of the mixture is dependent,
   second sensing means operatively associated with said pipeline and producing a continuous second signal representing the density of the mixture in said pipeline,
   a pipe connected into said pipeline in order continuously to withdraw a fraction of said fluid mixture from the pipeline at the pipeline pressure,
   a continuous separator having an inlet connected to said pipe to receive said fraction of said fluid mixture at the pipeline pressure and first and second outlets, the separator being operative to separate any gaseous component from the non-gaseous component(s) of said mixture, any said gaseous component being supplied to said first outlet and said non-gaseous component(s) to said second outlet,
   third sensing means operatively associated with said separator adjacent said second outlet to produce a continuous third signal representing the combined density of the non-gaseous component(s) of the mixture,
   processing means operatively connected to said first, second and third sensing means for continuously receiving therefrom said first, second and third signals and operative to process them, together with known data on the density of each component, to produce outputs respectively representing the flow rate of each fluid component passed through said pipeline, and
   further pipe means connecting said two outlets of said separator into said pipeline whereby to feed back into said pipeline, at the pipeline pressure, any said gaseous component and said non-gaseous component(s).

2. A flow meter according to claim 1, in which said first sensing means comprises a velocity meter, a pressure sensor and a temperature sensor, each operatively associated with said pipeline and each having an output constituting a said first signal which is fed to said processing means.

3. A flow meter according to claim 1, in which either or each of said second and third sensing means includes a nucleonic density meter.

4. A flow meter according to claim 1, in which said third sensing means includes a capacitive density meter.

5. A flow meter according to claim 1, in which said second sensing means includes a differential pressure meter and a velocity meter operatively associated with said pipeline.

6. A flow meter, suitable for location in a sub-sea environment, for continuously measuring the flow of each of up to three distinct fluid components, at least one being liquid and at least one other being gaseous, of a mixture flowing through a pipeline, and comprising:
   first sensing means operatively associated with said pipeline and producing continuous first signals representing the values, existing in the mixture, of parameters on which the total volume flow rate of the mixture is dependent,
   second sensing means operatively associated with said pipeline and producing a continuous second signal representing the density of the mixture in said pipeline, a pipe connected into said pipeline in order continuously to withdraw a fraction of said fluid mixture from the pipeline, a continuous separator having an inlet connected to said pipe and first and second outlets, the separator being operative to separate any gaseous component from the non-gaseous component(s) of said mixture, any said gaseous component being supplied to said first outlet and said non-gaseous component(s) to said second outlet, third sensing means operatively associated with said separator adjacent said second outlet to produce a continuous third signal representing the combined density of the non-gaseous component(s) of the mixture, processing means operatively connected to said first, second and third sensing means for continuously receiving therefrom said first, second and third signals and operative to process them, together with known data on the density of each component, to produce outputs respectively representing the flow rate of each fluid component passed through said pipeline, and further pipe means connecting said two outlets of said separator into said pipeline, said continuous separator including a vertically disposed cylindrical chamber having said fluid inlet adjacent the top of the chamber, said fluid inlet being adapted to direct the incoming fluid tangentially around a cylindrical interior wall of said chamber, whereby the swirling motion of the fluid mixture around said interior wall at least partially separates out any said gaseous component from the non-gaseous component(s), an open-ended conical mesh member being disposed with its base below said inlet, the mesh member permitting non-gaseous component(s) to pass through and catching any gaseous component not separated by said swirling motion and facilitating its subsequent escape, said first outlet being disposed above said inlet and above a top end of said mesh member for collecting the gaseous component separated by said swirling motion and the gaseous component caught by and subsequently escaping from the mesh member, and said second outlet being disposed below said mesh member.

7. A flow meter according to claim 6, in which said means for producing the third signal representing density is disposed in said chamber below said mesh member.

8. A separator for continuously separating a gaseous component from at least one non-gaseous component in a mixture of said components, comprising a vertically disposed cylindrical chamber having a fluid inlet adjacent the top of the chamber, said fluid inlet being adapted to direct the incoming fluid tangentially around the cylindrical internal wall of the chamber, whereby the resultant swirling motion of the fluid mixture around said interior wall at least partially separates the gaseous component from the non-gaseous component, an open-ended conical mesh member disposed with its base below said inlet whose meshes permit non-gaseous components to pass through and catching any gaseous component not separated by said swirling motion and facilitating its subsequent escape, a gaseous component outlet from the said chamber disposed above said inlet and above the top end of said mesh member, for collecting the gas component separated by said swirling motion and the gas component caught by and subsequently escaping from said meshes, and a non-gaseous component outlet from said chamber disposed below said mesh member for the non-gaseous components of the input fluid.

9. A separator according to claim 8, in which two coaxial mesh members are provided nested one above the other.

10. A separator according to claim 9, in which the mesh of the lower mesh member is finer than that of the upper mesh member.

11. A flow meter according to claim 2, in which said velocity meter produces a signal F representing the flow velocity of said fluid in the pipeline, said pressure sensor produces a signal P representing the fluid pressure of the fluid in said pipeline, and said temperature sensor produces a signal T representing the temperature of the fluid in said pipeline, and in which said processing means is operative to derive continuously from said signals F,P and T said volume flow rate V of the mixture in the pipeline according to the equation.

$$V = \frac{P \cdot F}{T} fz (P,F,T)$$

where fz(P,F,T) is a function of P,F and T constituting a super compressibility factor.

12. A flow meter suitable for location in a sub-sea environment, for continuously measuring the flow of each of up to three distinct fluid components, at least one being liquid and at least one other being gaseous, of a mixture flowing through a pipeline, and comprising:

a velocity meter producing a signal F representing the flow velocity of said fluid in the pipeline, a pressure sensor producing a signal P representing the fluid pressure of the fluid in said pipeline, and a temperature sensor producing a signal T representing the temperature of the fluid in said pipeline;

second sensing means operatively associated with said pipeline and producing a continuous second signal $D_1$ representing the density of the mixture in said pipeline;

a pipe connected into said pipeline in order continuously to withdraw a fraction of said fluid mixture from the pipeline;

a continuous separator having an inlet connected to said pipeline and first and second outlets, the separator being operative to separate any gaseous component from the non-gaseous component(s) of said mixture, any said gaseous component being supplied to said first outlet and said non-gaseous component(s) to said second outlet;

third sensing means operatively associated with said separator adjacent said second outlet to produce a continuous third signal $D_2$ representing the combined density of the non-gaseous component(s) of the mixture;

processing means operatively connected to said velocity meter, said pressure sensor, and said temperature sensor for continuously receiving therefrom said signals F, P and T and operative to process them to derive continuously therefrom said volume flow rate V of the mixture in the pipeline according to the equation $$V = \frac{P \cdot F}{T} fz\,(P,F,T)$$

where fz (P,F,T) is a function of P, F and T constituting a super compressibility factor,
the processing means also being operatively connected to said second and third sensing means for continuously receiving therefrom said signal $D_1$, and said signal $D_2$, the processing means being operative, using known values $d_1$, $d_2$ and $d_3$,
where $d_1$ = density of said gaseous component,
$d_2$ = density of a first said liquid component,
$d_3$ = density of a second liquid component,
to derive continuously from said second and third signals the volume flow rate of each of said components passing through the pipeline according to the equations $$D_2 = (v_2.d_2)/(v_2+v_3) + (v_3.d_3)/(v_2+v_3)$$

and $D_1 = (v_1.d_1)/V + (v_2.d_2)/V + (v_3.d_3)/V$
where $v_1$, $v_2$ and $v_3$ are respectively the said volume flow rates of the gaseous, first liquid and second liquid components as they pass through the pipeline.

13. A flow meter, suitable for location in a hostile environment, for continuously measuring the flow of each of a gaseous component and two liquid components of a mixture flowing through a pipeline, and comprising:
first sensing means operatively associated with said pipeline for giving continuous first signals P, T and F, where P, T and F represent the values, existing in the mixture, of respectively the fluid pressure, temperature and flow velocity,
second sensing means operatively associated with said pipeline for giving a continuous second signal $D_1$, where $D_1$ represents the density of said mixture,
a pipe connected into said pipeline for continuously diverting a fraction of said mixture therefrom, a separator having an inlet connected to said pipe and further having a first outlet and a second outlet, and being operative to continuously separate any gaseous component from the non-gaseous components of said fraction, and to continuously supply such gaseous component to said first outlet and said non-gaseous components to said second outlet,
third sensing means operatively associated with said separator adjacent said second outlet to produce a continuous third signal $D_2$, where $D_2$ represents the combined density of said liquid components,
further pipe means connecting said outlets into said pipeline for continuously returning said fraction to the pipeline, and
processing means operatively connected with said first, second and third sensing means for receiving continuously therefrom said first, second and third signals, and having output means for delivering signals representing the flow rate of each said component passed through the pipeline,
said processing means being operative to derive continuously from said first signals the volume flow rate of the mixture in the pipeline according to the equation $$V = \frac{P \cdot F}{T} fz\,(P,F,T)$$

where V = said volume flow rate and fz(P,F,T) is a function of P,F and T constituting a super compressibility factor, and being further operative, using known values $d_1$, $d_2$ and $d_3$,
where $d_1$ = density of said gaseous component,
$d_2$ = density of a first said liquid component,
$d_3$ = density of the second said liquid component,
to derive continuously from said second and third signals the volume flow rate of each of said components passing through the pipeline according to the equations $$D_2 = (v_2.d_2)/(v_2+v_3) + (v_3.d_3)/(v_2+v_3)$$

and $D_1 = (v_1.d_1)/V + (v_2.d_2)/V + (v_3.d_3)/V$
where $v_1$, $v_2$ and $v_3$ are respectively the said volume flow rates of the gaseous, first liquid and second liquid components as they pass through the pipeline.

14. A sub-sea flow meter, for continuously measuring the individual flows of gas, oil and water in a mixture flowing from a submarine oil well through a pipeline for receiving said mixture from the well, the flow meter comprising a sub-sea unit mounted adjacent the oil well, said sub-sea unit comprising:
first sensing means operatively associated with said pipeline for giving continuous first signals representing the values, existing in the mixture, of parameters from which the total volume flow rate in the pipeline can be derived,
second sensing means operatively associated with said pipeline for giving a continuous second signal representing the density of said mixture, a pipe connected into said pipeline for continuously diverting a fraction of said mixture therefrom,
a separator having an inlet connected to said pipe and further having a first outlet and a second outlet, and being operative to continuously separate the gas from the oil and water of said fraction and to continuously supply said gas to said first outlet and said oil and water to said second outlet,
third sensing means operatively associated with said separator adjacent said second outlet to produce a continuous third signal representing the combined density of the oil and water, and
further pipe means connecting said outlets into said pipeline for continuously returning said fraction to the pipeline,
the flow meter further comprising processing means, operatively connected with said first, second and third sensing means for receiving continuously therefrom said first, second and third signals, said processing means being operative to derive from said first signals the volume flow rate of said mixture in the pipeline and to derive, from said volume flow rate, said second and third signals, and known data on the density of each said component, three continuous outputs representing respectively the rate at which each of said gas, oil and water is flowing from the well, at least part of said processing means being located on the surface remote from said sub-sea unit, and
communication link means operatively connecting the sub-sea unit with said at least part of the processing means to supply the appropriate input signals to the latter.

* * * * *